(12) United States Patent
Mohare et al.

(10) Patent No.: US 11,587,546 B2
(45) Date of Patent: *Feb. 21, 2023

(54) APPARATUSES AND METHODS FOR SUPERPOSITION BASED WAVE SYNTHESIS

(71) Applicant: Pradnesh Mohare, Kenner, LA (US)

(72) Inventors: Pradnesh Mohare, Kenner, LA (US); Rahul Khopkar, Burnaby (CA)

(73) Assignee: Pradnesh Mohare, Kenner, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/136,281

(22) Filed: Dec. 29, 2020

(65) Prior Publication Data

US 2021/0118420 A1    Apr. 22, 2021

Related U.S. Application Data

(63) Continuation of application No. 16/339,439, filed as application No. PCT/IN2017/050448 on Oct. 4, 2017, now Pat. No. 10,909,967.

(60) Provisional application No. 62/404,093, filed on Oct. 4, 2016.

(51) Int. Cl.
| | | |
|---|---|---|
| *G10K 15/02* | (2006.01) | |
| *H04R 7/12* | (2006.01) | |
| *H04R 7/14* | (2006.01) | |
| *H04R 7/16* | (2006.01) | |
| *H04R 19/02* | (2006.01) | |
| *G06F 13/10* | (2006.01) | |
| *H04R 3/04* | (2006.01) | |

(52) U.S. Cl.
CPC ............. *G10K 15/02* (2013.01); *G06F 13/10* (2013.01); *H04R 3/04* (2013.01); *H04R 7/125* (2013.01); *H04R 7/14* (2013.01); *H04R 7/16* (2013.01); *H04R 19/02* (2013.01)

(58) Field of Classification Search
CPC .......... H03G 9/025; H03G 5/165; H04R 3/04; H04R 2430/03; H04R 5/02
USPC ..................................... 381/89, 102
See application file for complete search history.

(56) References Cited

U.S. PATENT DOCUMENTS

| | | | | |
|---|---|---|---|---|
| 4,504,786 A | * | 3/1985 | Slaughter | G01R 23/16 324/76.39 |
| 7,813,514 B2 | | 10/2010 | Asada | |
| 8,019,454 B2 | | 9/2011 | Haulick et al. | |
| 8,300,840 B1 | | 10/2012 | Frye | |
| 2006/0057996 A1 | * | 3/2006 | Petrovic | H03D 3/007 455/260 |

(Continued)

OTHER PUBLICATIONS

International Search Report for corresponding PCT Application No. PCT/IN2017/050448 dated Jan. 24, 2018.

*Primary Examiner* — Alexander Krzystan
(74) *Attorney, Agent, or Firm* — Budzyn IP Law, LLC

(57) ABSTRACT

The invention provides apparatus and methods for interference based wave synthesis. The invention comprises (i) receiving information defining output wave characteristics, said output wave characteristics comprising at least an output wave frequency B, and an output signal amplitude M, (ii) determining a constant value A and (iii) driving a first input wave generator to generate a first input wave and (iv) driving a second input wave generator to generate a second input wave, such that the interfered wave synthesized by interference of the first input wave and the second input wave has output wave characteristics defined by the received information.

25 Claims, 9 Drawing Sheets

(56) References Cited

U.S. PATENT DOCUMENTS

| | | | | |
|---|---|---|---|---|
| 2010/0080564 A1* | 4/2010 | Fujii | ...................... | H04B 10/63 |
| | | | | 398/115 |
| 2011/0203389 A1* | 8/2011 | Kitami | .................. | G01F 1/8431 |
| | | | | 73/861.356 |
| 2013/0034244 A1* | 2/2013 | Van Raalte | ............ | G10K 15/04 |
| | | | | 381/97 |
| 2013/0182883 A1* | 7/2013 | Takeda | ................... | H04R 1/323 |
| | | | | 381/387 |
| 2016/0345104 A1* | 11/2016 | Margalit | .................. | H04R 1/24 |
| 2017/0280998 A1* | 10/2017 | Ariga | ..................... | A61B 3/165 |
| 2019/0052960 A1* | 2/2019 | Bharitkar | ................ | G10L 25/12 |
| 2019/0237060 A1* | 8/2019 | Mohare | ................... | H04R 3/04 |

* cited by examiner

APPARATUSES AND METHODS FOR SUPERPOSITION BASED WAVE SYNTHESIS

The invention relates to apparatuses and methods for generating output waves having a preferred frequency. In particular, the invention enables generation of an output wave through superposition of a plurality of input waves.

BACKGROUND

Wave generation is a complex domain with varied practical applications, including for example in the domain of audio technologies.

Each wave may be understood as a summation of one or more sinusoidal signals each of which is capable of being represented as a sinusoidal waveform that is capable of being expressed in the form of the following function:

$$F(t)=M\cdot\sin(X\cdot t+Z) \quad \text{Eq (1)}$$

where (i) M is the amplitude, (ii) X is the frequency and (iii) Z is the initial phase.

It has however been found that generation of waves is governed by physical aspects and limitations of the drivers that are used for the purpose of generating such waves. In particular, it has been found that generation of waves at certain frequencies can be complex, inefficient or resource intensive in comparison with generation of waves at other frequencies. By way of a specific example, in the audio technology domain, generation of frequencies below 200 Hz (for example 20 Hz to 200 Hz, or even below 20 Hz) has been found to require drivers (e.g. speakers) that are far larger in size (and therefore more complex and expensive to manufacture) than drivers used to generate higher frequencies (e.g. woofers, mid-range speakers and tweeters), and with higher energy consumption requirements. Addressing issues concerning resonant frequency, and damping typically affect enclosure considerations, including size, weight, design, construction and cost of traditional designs for low frequency drivers.

A potential solution to the problem of generating waves at particular frequencies that are difficult, complex or inconvenient to generate, is to apply principles of wave superposition to combine a plurality of input waves having specifically chosen frequencies to generate a resultant (superposed) output wave having a desired frequency. The underlying theory of this approach has been that interference between the plurality of input waves would result in generation of an output wave having the required frequency characteristics.

It was however found that while combining two or more input waves having different frequencies could potentially result in a combined output wave having a desired frequency, the resulting output wave would have a time-varying amplitude component—rendering the output wave undesirable for practical applications. In the audio domain, this problem may be observed when combining two input waves of differing selected frequencies results in an output wave of a desired frequency but having a beat waveform (i.e. a time-varying amplitude/volume characteristic).

There is accordingly a need for a solution wherein a plurality of input waves can be efficiently combined to generate a superposed output wave having controllable or desired frequency and amplitude characteristics.

SUMMARY

The invention provides an apparatus for interference based wave synthesis. The apparatus comprises a first input wave generator, a second input wave generator, and a signal processor. The signal processor may be configured to (i) receive information defining output wave characteristics, said output wave characteristics comprising at least an output wave frequency B, and an output signal amplitude M, (ii) determine a constant value A and (iii) drive the first input wave generator to generate a first input wave and (iv) drive the second input wave generator to generate a second input wave. Said first input wave may have a frequency (A+B), and an amplitude that is a function of $1/(2*\sin(A*t))$. The second input wave may have a frequency (A−B), and an amplitude that is a function of $1/(2*\sin(A*t))$.

The signal processor may be configured to (i) drive the first input wave generator to generate the first input wave, such that said first input wave has an amplitude that is equal to $M/(2*\sin(A*t))$, and (ii) drive the second input wave generator to generate the second input wave, such that said second input wave has an amplitude that is equal to $M/(2*\sin(A*t))$.

The first input wave generator may be configured to define a first wave output path, and the second input wave generator may be configured to define a second wave output path, such that the first input wave and the second input wave interfere with each other within an interference region defined by an intersection of the first wave output path and the second wave output path.

In an apparatus embodiment, an output wave generated by interference of the first input wave and the second input wave satisfies the waveform expression $$\cos B=(\sin(A+B)+\sin(A-B))/(2\sin A).$$

In another embodiment, an output wave generated by interference of the first input wave and the second input wave satisfies the waveform expression $$\sin B=(\sin(A+B)-\sin(A-B))/(2\cos A).$$

An output wave generated by interference of the first input wave and the second input wave may satisfy the waveform expression $$\cos B=(\cos(A+B)+\cos(A-B))/(2\cos A).$$

In another embodiment, wherein an output wave generated by interference of the first input wave and the second input wave satisfies the waveform expression $$\sin B=(\cos(A-B)-\cos(A+B))/(2\sin A)$$

The first input wave generator may comprise a first input wave generating surface and the second input wave generator comprises a second input wave generating surface, wherein said first input wave generating surface and said second input wave generating surface are positioned to face each other.

In an apparatus embodiment, frequency B is a frequency within a 20 Hz to 200 Hz range, and each of frequency (A+B) and frequency (A−B) is a frequency within a 20,000 Hz and 20 MHz range.

In an embodiment, the apparatus is a speaker.

The invention additionally provides a method for interference based wave synthesis. The method comprises (i) receiving information defining output wave characteristics, said output wave characteristics comprising at least an output wave frequency B, and an output signal amplitude M, (ii) determining a constant value A, (iii) generating a first input wave, wherein said first input wave has a frequency (A+B), and an amplitude that is a function of $1/(2*\sin(A*t))$, and (iv) generating a second input wave, wherein said first input wave has a frequency (A−B), and an amplitude that is a function of $1/(2*\sin(A*t))$.

In a method embodiment, the first input wave has an amplitude that is equal to M/(2*sin(A*t)), and the second input wave has an amplitude that is equal to M/(2*sin(A*t)).

In another embodiment of the method, a first input wave generator may be configured to generate the first input wave has a defined first wave output path, and a second input wave generator may be configured generate the second input wave has a defined second wave output path, such that the first input wave and the second input wave interfere with each other within an interference region defined by an intersection of the first wave output path and the second wave output path.

In a method embodiment, an output wave generated by interference of the first input wave and the second input wave may satisfy the waveform expression $$\cos B = (\sin(A+B) + \sin(A-B))/(2 \sin A).$$

In another embodiment of the method, an output wave generated by interference of the first input wave and the second input wave satisfies the waveform expression $$\sin B = (\sin(A+B) - \sin(A-B))/(2 \cos A).$$

In a further embodiment, an output wave generated by interference of the first input wave and the second input wave satisfies the waveform expression $$\cos B = (\cos(A+B) + \cos(A-B))/(2 \cos A).$$

In an alternate embodiment of the method, an output wave generated by interference of the first input wave and the second input wave satisfies the waveform expression $$\sin B = (\cos(A-B) - \cos(A+B))/(2 \sin A)$$

The invention additionally provides a computer program product for implementing interference based wave synthesis. The computer program product may comprise a non-transitory computer usable medium having computer readable program code embodied therein, the computer readable program code comprising instructions for (i) receiving information defining output wave characteristics, said output wave characteristics comprising at least an output wave frequency B, and an output signal amplitude M, (ii) determining a constant value A, (iii) generating a first input wave, wherein said first input wave has a frequency (A+B), and an amplitude that is a function of 1/(2*sin(A*t)), and (iv) generating a second input wave, wherein said first input wave has a frequency (A−B), and an amplitude that is a function of 1/(2*sin(A*t)).

BRIEF DESCRIPTION OF THE ACCOMPANYING DRAWINGS

DETAILED DESCRIPTION

Figure 1:
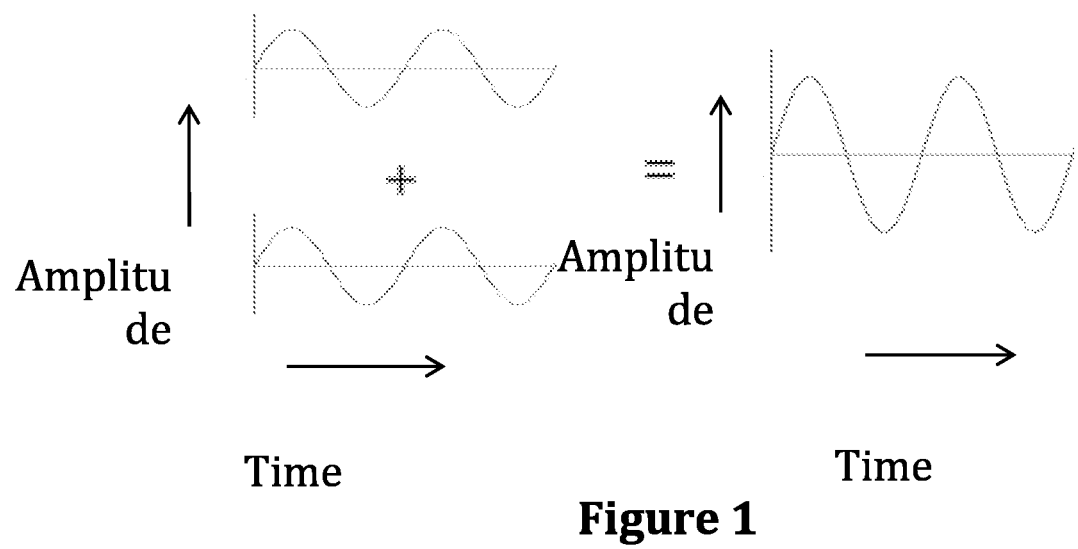
FIGS. 1 to 3 illustrate exemplary instances of wave superposition.

FIG. 1 illustrates an exemplary instance of wave superposition, wherein a first wave and a second wave having identical amplitude and frequency characteristics and having a phase difference that is an even multiple of □ (180°) respective to each other, and therefore combine constructively so that the amplitude of the resultant wave is the sum of the amplitude of the first and second waves, and is greater than the individual amplitude of either.

Figure 2:
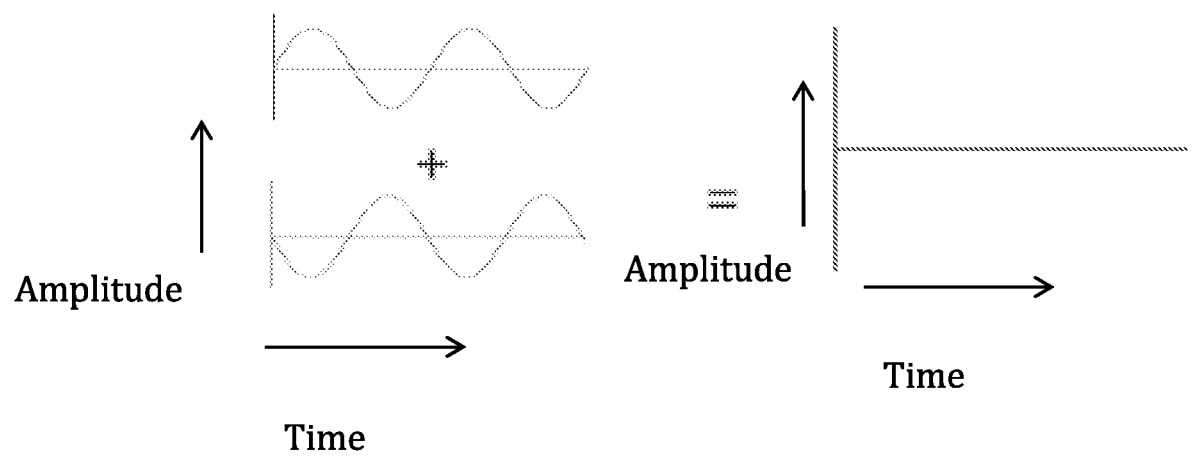

FIG. 2 illustrates an instance of wave superposition, wherein a first wave and a second waves having identical amplitude and frequency characteristics are separated by a phase difference that is an odd multiple of □ (180°) respective to each other, and therefore combine destructively so that the amplitude of the resultant wave is intermediate to the amplitude of the first and second waves—and therefore cancel each other out.

Figure 3:
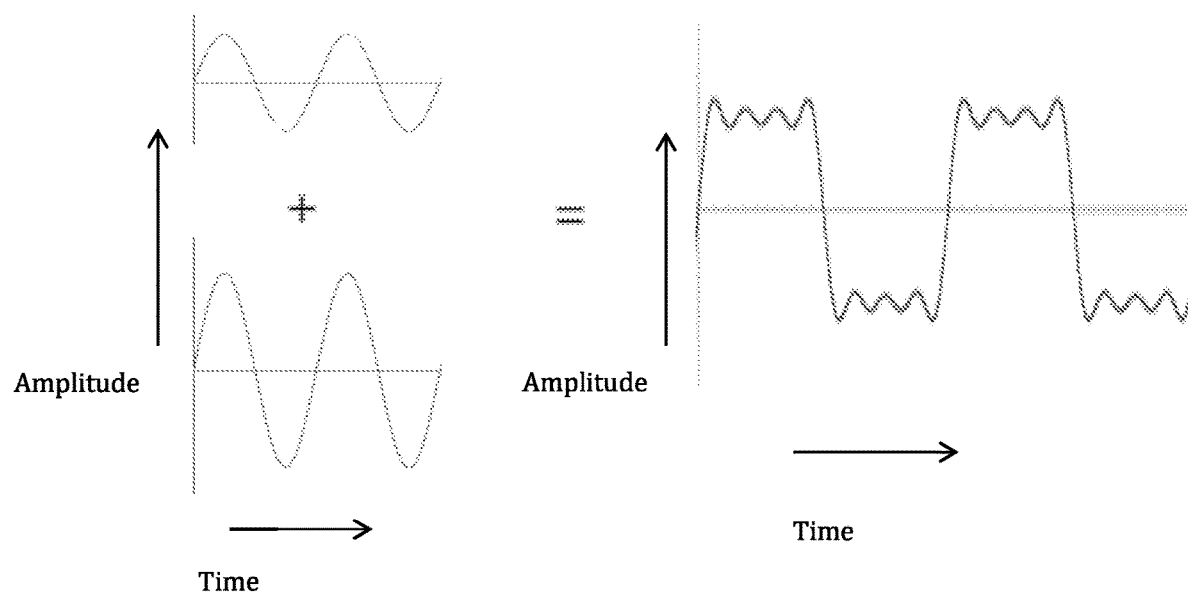

It would however be understood that wave superposition does not necessarily (or for that matter ordinarily) involve combining of waves having identical amplitude and frequency characteristics, and therefore rarely results in perfect constructive or destructive interference. Instead, wave superposition more often than not would involve at least a first wave and a second wave of the kind illustrated in FIG. 3—having differing amplitude. frequency and/or phase characteristics, resulting in an output wave having a complex waveform of the type illustrated in FIG. 3.

The present invention is premised on the surprising discovery that waves having different (and convenient to generate) characteristics such as frequency, amplitude, phase etc. can be selected, generated and combined in a controlled manner to generate output waves having desired characteristics such as frequency, amplitude, phase etc.

An interference/superposition of any two sine waves of same amplitude M and with frequencies X and Y respectively, can be expressed as:

$$M*\sin(X*t) + M*\sin(Y*t) = 2*M*\sin(((X+Y)/2)*t)*\cos(((X-Y)/2)*t) \quad \text{Eq (2)}$$

or alternatively, as $$\sin(X*t) + \sin(Y*t) = 2*\sin(((X+Y)/2)*t)*\cos(((X-Y)/2)*t) \quad \text{Eq (3)}$$

By expressing X and Y respectively as the sum and the difference of two frequencies, A and B (i.e. where X=(A+B), and Y=(A−B)), an interference/superposition of the two sine waves of amplitude M and with frequencies X and Y respectively, can be expressed as:

$$M*\sin((A+B)*t) + M*\sin((A-B)*t) = 2*M*\sin(A*t)*\cos(B*t) \quad \text{Eq (4)}$$

Thus, if two sine waves having amplitude M and having frequencies (A+B) and (A−B) respectively are interfered/superposed, the resultant waveform is a beat with two frequency components A and B. Hence a wave having frequency A or frequency B can be generated by interfering or superposing two waves with frequencies (A+B) and (A−B) respectively.

If, for example, the above superposed waveform is considered as having superposed frequency B, the amplitude of said superposed waveform can be represented as 2*M*sin(A*t).

This amplitude is time-varying and not constant, and as a consequence, this resulting waveform is typically practically unusable for either of frequencies A or B.

The present invention addresses this problem by processing each of the two input waves so that the amplitude of each of the two input waves is a function of $1/(2*M*\sin(A*t))$. In an embodiment, the invention addresses the problem of time varying amplitude by ensuring that the amplitude of each of the two input waves is equal to the product of (i) the intended amplitude (M) of the superposed output wave and (ii) $1/(2*M*\sin(A*t))$.

By interfering or superposing two input waves respectively having frequencies equal to (A+B) and (A−B) and amplitude that is a function of (and preferably equal to) $M/(2*\sin(A*t))$, the resulting superposed output wave can be expressed as any of the following:

$$\cos(B*t)=\sin((A+B)*t)/(2*\sin(A*t))+\sin*(A-B)*t)/(2*\sin(A*t)) \quad \text{Eq (5)}$$

or $$\sin A \cos B=(\sin(A+B)+\sin(A-B))/2 \quad \text{Eq (6)}$$

or $$\cos B=(\sin(A+B)+\sin(A-B))/(2 \sin A) \quad \text{Eq (7)}$$

or $$\cos A \sin B=(\sin(A+B)-\sin(A-B))/2 \quad \text{Eq (8)}$$

or $$\sin B=(\sin(A+B)-\sin(A-B))/(2 \cos A) \quad \text{Eq (9)}$$

or $$\cos A \cos B=(\cos(A+B)+\cos(A-B))/2 \quad \text{Eq (10)}$$

or $$\cos B=(\cos(A+B)+\cos(A-B))/(2 \cos A) \quad \text{Eq (11)}$$

or $$\cos A=(\cos(A+B)+\cos(A-B))/(2 \cos B) \quad \text{Eq (12)}$$

or $$\sin A \sin B=(\cos(A-B)-\cos(A+B))/2 \quad \text{Eq (13)}$$

or $$\sin B=(\cos(A-B)-\cos(A+B))/(2 \sin A) \quad \text{Eq (14)}$$

or $$\sin A=(\cos(A-B)-\cos(A+B))/(2 \sin B) \quad \text{Eq (15)}$$

By selecting the input waves so as to respectively have frequencies of (A+B) and (A−B) and amplitude equal to $M/(2*\sin(A)*t)$, the invention enables generation of a superposed output wave having frequency B, and a constant amplitude M—unlike the time varying (beat pattern) amplitudes of the resultant output wave when two non-preconditioned waves are interfered or superposed.

A key advantage over previous approaches is the amplitude of the resultant wave is constant unlike the time-varying amplitude of the resultant wave when 2 non-preconditioned waves are interfered/superposed resulting in a beat pattern that hence cannot be put to practical use.

It would be understood that for generating a superposed output wave having frequency B, the invention allows selection of any constant value A that would be convenient for generating input waves having frequencies (A+B) and (A−B). Since the selected value for constant A may be any value, the invention enables, generation of a wave having frequency B within a first frequency range using input waves having frequencies (A+B) and (A−B) respectively, wherein the frequency range within which frequencies (A+B) and (A−B) lie may be significantly removed from the frequency B of the desired superposed output wave. By appropriate selection of the constant value A, frequency B of the desired superposed output wave may be significantly different from the respective frequencies (A+B) and (A−B) of the input waves.

In a particular embodiment of the invention, with specific applications within the audio domain, the methods and apparatuses of the present invention may be implemented for using input waves having high frequencies to generate a superposed output wave having relatively lower frequencies. It would be understood that for a desired output frequency B, a high value for value A may be selected such that the (A+B) and (A−B) are both in the higher frequency range, thereby enabling generation of an output sound wave having a much lower frequency B. By generating high frequency input waves having frequencies (A+B) and (A−B) to generate much lower frequencies B, the present invention allows for generation of low and ultra-low frequencies using drivers suited configured for much higher frequencies—and thereby avoiding the driver size and input power requirements associated with generating low and ultra low frequencies. The invention additionally avoids other disadvantages associated with systems and assemblies for generating low and ultra low frequencies, including large enclosure size/system size/system weight/system dimensions, large form factor, high construction costs, design constraints and high system complexity. The invention additionally enables generating of desired output waves based on input waves that may in turn be generated in any number of ways including by way of (i) natural, periodic/repeating, non-repeating or aperiodic waves, (ii) one or more interfering waves, including constructive interference, phased array(s), generated as needed via mathematical functions, (iii) lookup table(s) (LUTs) or any permutation/combination of the above, including repetitions.

It would be immediately understood that the above described methods may be used to generate output waves having frequencies typically generated by woofers and sub-woofers (i.e. in the 20 Hz to 500 Hz range) by interfering or superposing input waves having significantly higher frequencies—for example, midrange frequencies (250 Hz to 2,000 Hz), treble frequencies (2,000 Hz to 20,000 Hz) and ultrasonic frequencies (20,000 Hz and above). Given a desired output wave frequency value B, constant value A may be selected such that input wave frequencies (A+B) and (A−B) respectively fall within any of the above described frequency ranges.

In a particularly advantageous embodiment of the invention, for a given desired output frequency B, constant value A may be selected such that input wave frequencies (A+B) and (A−B) both fall within the ultrasonic range of frequencies i.e. above 20,000 Hz (and optionally between 20,000 Hz and 20 MHz), such that the input waves are outside of the range of human hearing, and do not interfere with human perception of the desired output wave. In a yet more preferable embodiment of the invention, a desired output wave having frequency B falling within the 20 Hz to 500 Hz range is generated by interfering or superposing two input waves each having input wave frequencies (A+B) and (A−B) respectively, wherein the input wave frequencies (A+B) and (A−B) both fall within the ultrasonic range of frequencies i.e. above 20,000 Hz (and optionally between 20,000 Hz and 20 MHz).

The low frequency sounds resulting from implementing the teachings of the present invention are produced in the air/medium via interference of waves and not directly by the speaker(s) themselves. Unlike traditional woofers or sub-woofers therefore, the resonant frequency(ies) of a speaker system implementing the teachings of the invention lie in the ultrasonic range. Accordingly, handling of resonance of the speaker driver(s) and of the assembly(ies), as applicable is much simpler, resulting in the overall assembly/system being significantly lighter, smaller, thinner, less expensive and easier to design. Additionally, it enables production of speakers or speaker assemblies in a multitude of form factors, previously not possible.

Figure 4:
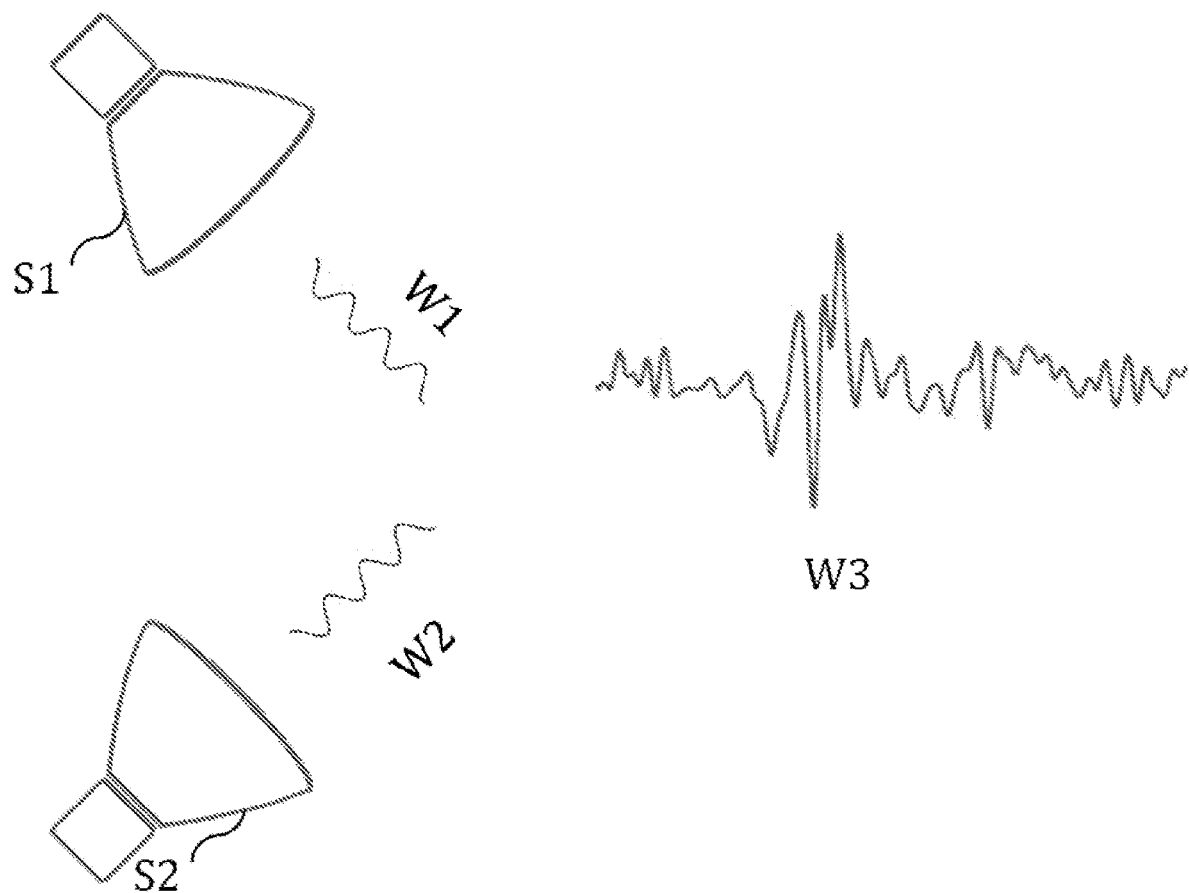
FIG. 4 illustrates an exemplary illustration of the manner in which wave superposition in the audio domain.

FIG. 4 illustrates an audio domain based implementation of the present invention wherein a first audio signal driver S1 is used to generate a first input wave W1, and a second audio signal driver S2 is used to generate a second input wave W2, and wherein audio signal drivers S1 and S2 are positioned such that first input wave W1 and second input wave W2 interfere—result in a superposed output wave W3. By configuring or operating first and second audio signal drivers S1 and S2 to generate input waves W1 and W2 in accordance with the methods described above, the invention embodiment ensures that superposed output wave W3 may have a wave frequency that is significantly different (and in particular embodiment significantly lower) than the respective wave frequencies of input waves W1 and W2.

Figure 5:
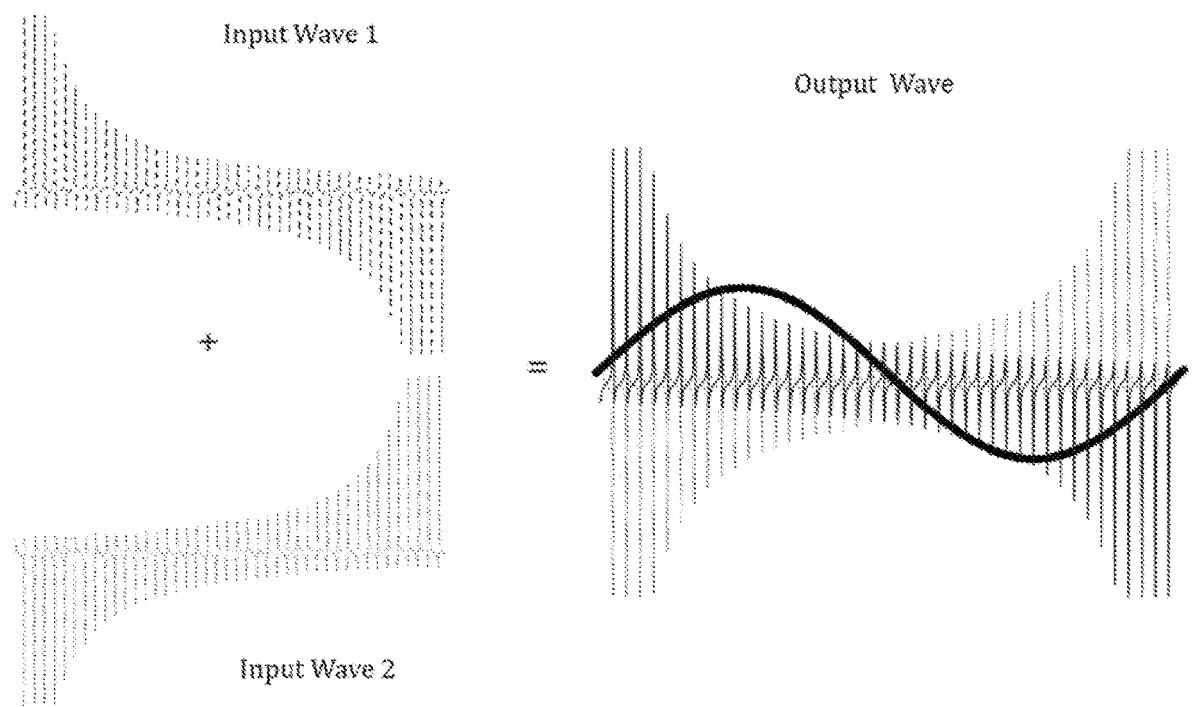
FIG. 5 is an exemplary graph of interfered/superposed input waveforms and of the resultant superposed output wave.

FIG. 5 illustrates a chart showing the respective amplitude-time domain of two input waves (input wave 1 and input wave 2 respectively represented by dashed lines) and the resulting output wave having a controlled or non-varying amplitude (output wave represented by the solid line sinusoidal waveform, which has for the purposes of the illustration been superimposed over the two input waves).

Figure 6:
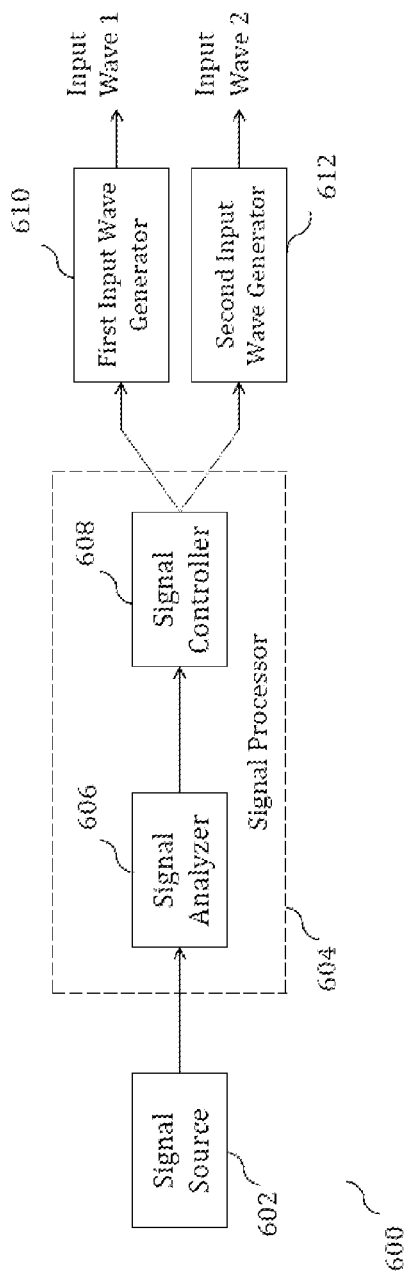
FIG. 6 illustrates an apparatus embodiment of the present invention.

FIG. 6 illustrates an exemplary apparatus 600 configured to implement the teachings of the present invention. Apparatus 600 includes signal source 602, signal processor 604, first input wave generator 610 and second input wave generator 612.

Signal source 602 may comprise any source of data or information which provides information regarding the signal characteristics of an output wave intended to be generated by apparatus 600. In an embodiment signal source 602 may comprise a digital signal source from which one or more digital signals that define signal characteristics of a desired output wave may be extracted. Exemplary instances of a digital signal source may include any transitory or non-transitory memory from which one or more digital signals can be received or extracted. In another embodiment signal source 602 may comprise an analog signal source—for example a microphone, or a transducer configured to detect one or more analog signals and optionally to convert the one or more analog signals to digital signals. In yet another embodiment, signal source 602 may comprise one or more signal sources that are capable of generating a hybrid or mixed signal based on a combination of analog and digital signals. It would additionally be understood that digital signals need note be retrieved from memory, and may instead be generated and received in real time from a digital signal source.

Signal processor 604 comprises signal analyzer 606 and signal controller 608 respectively. In an embodiment each of signal analyzer 606 and signal controller 608 may be implemented by means of one or more processors, integrated circuits, application specific integrated circuits, or other semiconductor arrangements, optical arrangements, or for that matter any other arrangement. Signal analyzer 606 may be configured to analyze digital signal characteristics of a desired output wave that are received from signal source 602 including amplitude, frequency and/or phase characteristics of the output signal. Signal analyzer 606 may additionally be configured to determine appropriate frequencies for a plurality of input waves that may be superimposed to generate a superposed output wave having the output wave signal characteristics received from signal source 602. In an exemplary embodiment of the invention, for an output wave having frequency B and amplitude M, signal analyzer may be configured to determine at least a first input wave frequency (A+B) and a second input wave frequency (A−B), wherein A is a constant value such that frequencies (A+B) and (A−B) are frequency values that are capable of being generated by first input wave generator 610 and second input wave generator 612 respectively.

Signal controller 608 may thereafter be configured to (i) drive first input wave generator 610 to generate a first input wave having frequency (A+B) and amplitude $M/(2*\sin(A))$, and (ii) drive second input wave generator 612 to generate a second input wave generator having frequency (A−B) and amplitude $M/(2*\sin(A*t))$.

In an embodiment, said first and second input wave generators 610, 612 may be configured or arranged such that resulting input wave 1 and input wave 2 interfere within an intersection region defined by an intersection region of a first output path corresponding to first input wave generator 610 and a second output path corresponding to second input wave generator 612. The interference of input wave 1 and input wave 2 within said intersection region results in generation of a superposed output wave having amplitude M and frequency B. While FIG. 6 illustrates a single signal source, single processor and single signal controller, it would be understood that the invention also contemplates embodiments having any a plurality of any one or more of signal sources, signal processors and signal controllers.

In an apparatus embodiment of the present invention, signal processor 604 may be configured to analyze and generate signals corresponding to input waves 1 and 2 in accordance with any of the invention embodiments discussed in detail above. It would be understood that while FIG. 6 illustrates two input waves, the teachings of the present invention can be applied to any larger number of input waves as well.

While the above method and apparatus embodiments of the present invention have been described in terms of generation of a superposed output wave by combining two input waves, it would be understood that the principles of the invention may equally be applied to generate a superposed output wave by combining more than two input waves. In one embodiment of the invention, generating a superposed output wave may comprise combining at least a first input wave and a second input wave to generate an intermediate output wave, and thereafter combining the intermediate output wave with a third input wave to generate the superposed output wave. It would be understood that generation of an intended superposed output wave may involve multiple instances of combining two waves to generate a third output wave, which third output wave may thereafter be combined with yet another input wave, until the desired superposed output wave is eventually generated. At each combining step, the methods for selecting frequencies and amplitudes of the input waves to said combining step would be based on the desired frequency and amplitude of the output wave from that particular combining step, wherein for a required output wave from a particular combining step to have frequency B and amplitude M, the two input waves for said combining steps may have frequencies (A+B) and (A−B) respectively and amplitude amplitude that is a function of (and preferably equal to) $M/(2*\sin(A*t))$—where, in an optional embodiment, A can be any selected constant value higher than the value B.

It would be understood that the method and apparatuses of the present invention do not place limits or constraints on the interfered or superposed input waves, including in terms of any of wave types, wave sources, number of waves, wave characteristics or wave parameters, wave transmission media, and apparatuses for effecting interference or superposition. It would particularly be understood that the invention is not limited to creating only sine or cosines waves, but can be used to create any type of waves including waves described by mathematical formulae or arbitrary or custom wave(s).

This method is not limited to creating only sine/cosines waves, but can be used to create any type of waves including waves described by mathematical formulae or arbitrary/custom wave(s).

In various embodiments of the invention, the input wave(s) may be natural, periodic/repeating, non-repeating, aperiodic, created from one or more interfering waves, including constructive interference, phased array(s), generated as needed via mathematical functions, lookup table(s) (LUTs) or any permutation/combination of the above, including repetitions.

The waves can be interfered in vacuum, within a medium, within multiple media or in any other way. The input waves may be interfered in a configuration where they are incident on each other, facing the same direction, parallel, anti-parallel, at an angle with respect to each other, or in any other configuration that permits for wave interference.

Yet further, selection of the number of waves to interfere/superpose, and selection of wave parameters such as frequencies, amplitudes, phases, physical implementation of the interference/superposition mechanism(s) etc. may depend on the particular application(s) and applicable factors, e.g. efficiency, directionality, size, power, energy, speed, cost, design, complexity, mitigation of unwanted side effects etc.

Additionally, optimization of the generation of the output wave may also be carried out via multiple methods including selection of appropriate source wave(s), characteristics, number of source wave(s), reference frequency(ies) method, sequence of interference of source and/or intermediate wave(s), transformation(s) to be performed and their order, creation and/or selection of lookup table(s) and values therein, etc.

In an apparatus embodiment of the invention, the first and second input wave generators may be configured to ensure that the generated first and second input waves are directly incident on each other to enable maximum interference (i.e. the largest possible number of interfering waves). Other apparatus embodiments may include additional features, such as sound proofing or ultrasonic damping configurations to prevent ultrasonic frequencies from exiting the intersection region of the first and second input wave generators, positioning of angled input wave generators such that the emitted input waves are directed downwards or away from the region of a subject's ears (to prevent organ damage due to exposure to ultrasonic frequencies) etc. In specific embodiments, the apparatus may include one or more waveguides to optimize interference of the first and second input waves within the intended wave intersection region.

This methods and apparatuses of the present invention have a universal/broad range of applications to waves of all kinds—including without limitation sound waves, electromagnetic waves of all kinds including light, laser, radio frequency, microwaves, waves through media such as shockwaves, gravitational waves etc. Exemplary applications include superposed output wave synthesis for audio, long range acoustic devices, energy/data transmission devices without the requirement for demodulation, application of cryptographic techniques to source and/or intermediate wave(s) to generate resultant wave(s) etc.

An additional advantage of the invention is that it also removes the need to demodulate the resultant wave to extract the original signal—which provides potential benefits in a multitude of applications, including, but not limited to, communications including spread spectrum communication technique involving private (or secure) demodulation, power transfer including power transfer techniques involving private metering etc.

As discussed above, one important embodiment of the invention involves application of the invention in the domain of generating audio signals and audio output—wherein the invention may be used to generate output waves having frequencies in the woofer and/or sub-woofer (i.e. in the 20 Hz to 500 Hz range) by interfering or superposing input waves having significantly higher frequencies—for example, midrange frequencies (250 Hz to 2,000 Hz), treble frequencies (2,000 Hz to 20,000 Hz) and ultrasonic frequencies (20,000 Hz and above). Given a desired output wave frequency value B, constant value A may be selected such that input wave frequencies (A+B) and (A−B) respectively fall within any of the above described frequency ranges. In a particularly advantageous embodiment of the invention, the invention may be used to a superposed output wave having woofer or sub-woofer range frequencies by interfering a plurality of input waves having within the ultrasonic range of frequencies. In a particularly advantageous embodiment, the above invention implementations may be used to manufacture a woofer or a sub-woofer capable of generating output sound waves in the in the 20 Hz to 500 Hz range based on superposition of input waves having significantly higher frequencies, for example in the midrange, treble or ultrasonic frequencies, thereby significantly reducing the required size and power inputs for the audio drivers/wave generators/speakers necessary to generate said output sound waves. Such implementations have been found to result in woofers and sub-woofers that are drastically thinner, lighter, and capable of manufacture at a significantly lower cost than existing woofer/sub-woofer system, and also capable of manufacture in a number of imaginative form factors (in absence of the minimum size requirement that was previously associated with woofer and sub-woofer systems).

Figure 7:
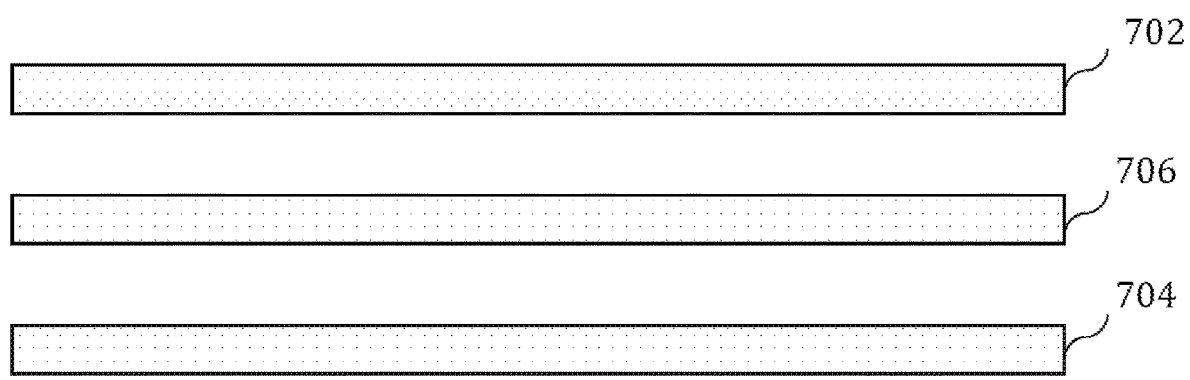
FIGS. 7 and 8 illustrate exemplary configurations for drivers/wave generators in accordance with teachings of the present invention.
Figure 8:
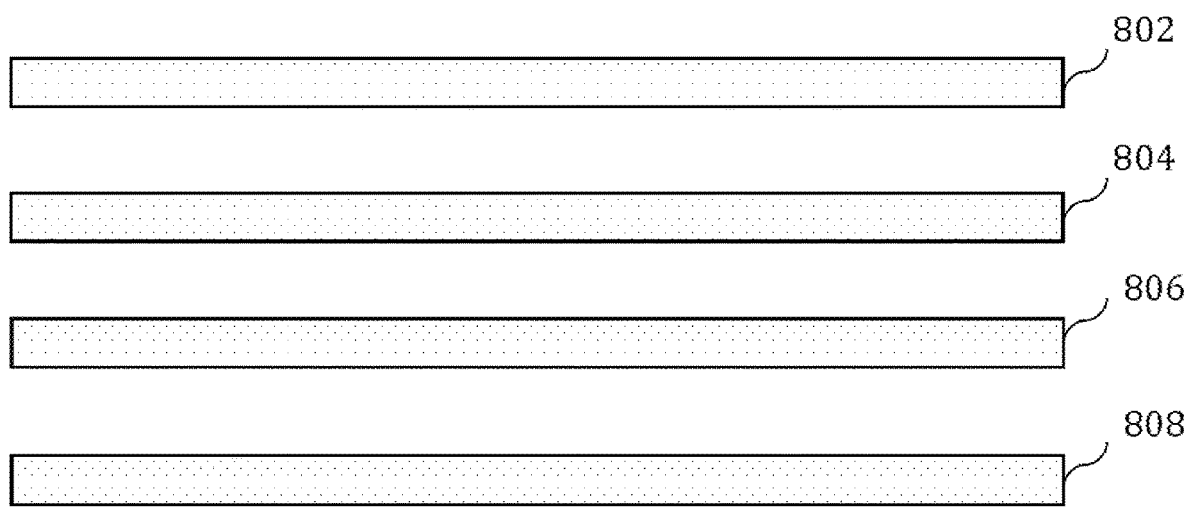

FIG. 7 illustrates an exemplary configuration for a plurality of drivers/input wave generators configured to generate input waves for interference in accordance with the teachings of the present invention. In the illustrated embodiment, the apparatus comprises fixed surfaces 702 and 704, with a movable surface (for example a diaphragm surface) 706 positioned between the two. In an embodiment, surfaces 702 and 704 may comprise electromagnetically charged surfaces or grids, while surface 706 may be a permanently magnetized surface. The two preconditioned input waves in accordance with the teachings of the present invention may be applied to surfaces 702 and 706 respectively—as a result of which surface pair 702, 704 generate input wave 1, while surface pair 704, 706 generate input wave 2, and the interference or superposition of input waves 1 and 2 occurs within surface 704 itself FIG. 8 illustrates an alternative exemplary configuration for a plurality of drivers/input wave generators configured to generate input waves for interference in accordance with the teachings of the present invention. The illustrated embodiment includes four parallelly positioned magnetic surfaces 802, 804, 806 and 808.

Surfaces 802 and 808 are fixed surfaces, while surfaces 804 and 806 are respectively moveable or diaphragm surfaces. Additionally surfaces 802 and 804 may each comprise an electromagnetically charged surface, or alternatively one of the two may comprise an electromagnetically charged surface while the other is a permanently magnetized surface. Likewise surfaces 806 and 808 may each comprise an electromagnetically charged surface, or one of the two may comprise an electromagnetically charged surface while the other is a permanently magnetized surface. The two preconditioned input waves may be applied to each of first surface pair 802, 804 and second surface pair 806, 808 respectively. Surface pair 802, 804 may be used to generate input wave 1, while surface pair 806, 808 may be used to generate input wave 2—such that interference/superposition of input wave 1 and input wave 2 occurs in the medium between surfaces 804 and 806.

Figure 9:
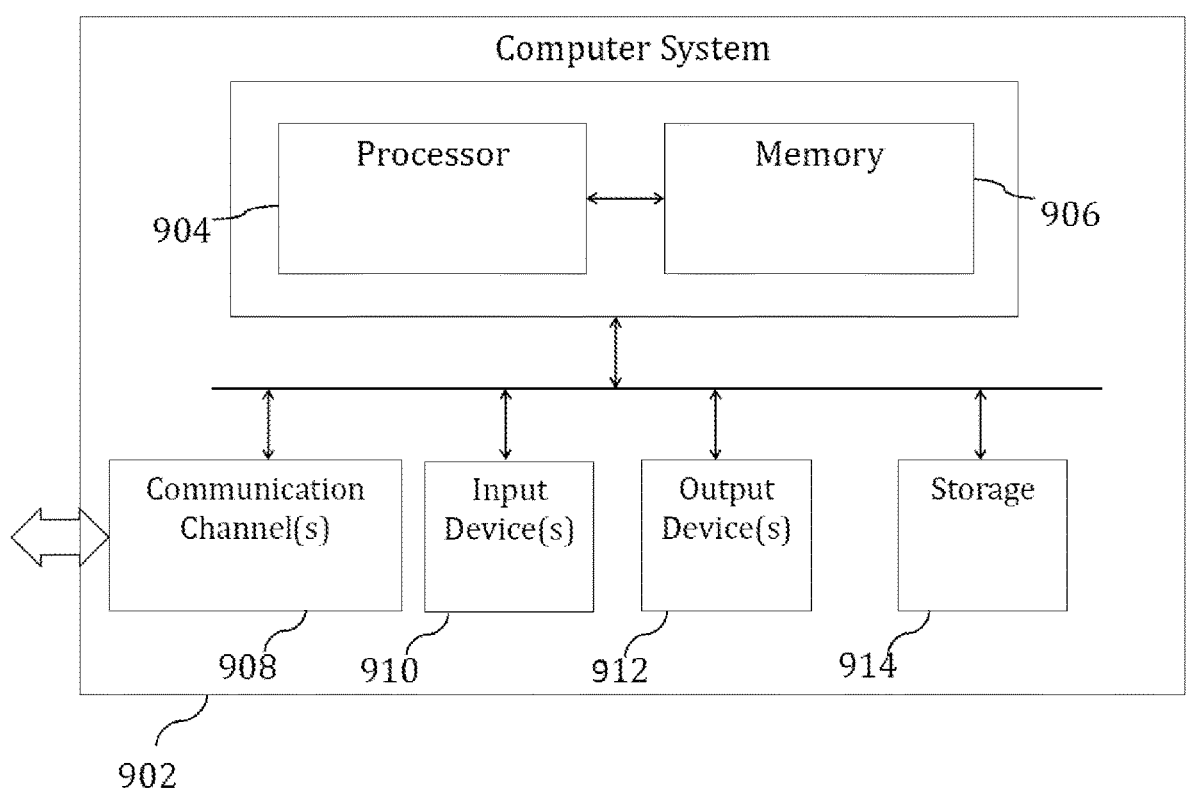
FIG. 9 illustrates a system that is configurable to implement the teachings of the present invention.

FIG. 9 illustrates an exemplary system for implementing the present invention.

The computer system 902 comprises one or more processors 904 and at least one memory 906. Processor 904 is configured to execute program instructions—and may be a real processor or a virtual processor. It will be understood that computer system 902 does not suggest any limitation as to scope of use or functionality of described embodiments. The computer system 902 may include, but is not be limited to, one or more of a general-purpose computer, a programmed microprocessor, a micro-controller, an integrated circuit, optical processor, ASIC, FPGA, SOC, development/custom board, embedded device, custom computer, DSP, a/v receiver, media box, smartwatch, any other electronic device, and other devices or arrangements of devices that are capable of implementing the steps that constitute the method of the present invention. Exemplary embodiments of a system 902 in accordance with the present invention may include one or more servers, desktops, laptops, tablets, smart phones, mobile phones, mobile communication devices, tablets, phablets and personal digital assistants. In an embodiment of the present invention, the memory 906 may store software for implementing various embodiments of the present invention. The computer system 902 may have additional components. For example, the computer system 902 may include one or more communication channels 908, one or more input devices 910, one or more output devices 912, and storage 914. An interconnection mechanism (not shown) such as a bus, controller, or network, interconnects the components of the computer system 902. In various embodiments of the present invention, operating system software (not shown) provides an operating environment for various software executing in the computer system 902 using a processor 904, and manages different functionalities of the components of the computer system 902.

The communication channel(s) 908 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 910 may include, but is not limited to, a touch screen, a keyboard, mouse, pen, joystick, trackball, a voice device, a scanning device, or any another device that is capable of providing input to the computer system 902. In an embodiment of the present invention, the input device(s) 910 may be a sound card or similar device that accepts audio input in analog or digital form. The output device(s) 912 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 902.

The storage 914 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 902. In various embodiments of the present invention, the storage 914 may contain program instructions for implementing any of the described embodiments.

In an embodiment of the present invention, the computer system 902 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 902. The method described herein is typically implemented as a computer program product, comprising a set of program instructions that is executed by the computer system 902 or any other similar device. The set of program instructions may be a series of computer readable codes stored on a tangible medium, such as a computer readable storage medium (storage 914), for example, diskette, CD-ROM, ROM, flash drives or hard disk, or transmittable to the computer system 902, via a modem or other interface device, over either a tangible medium, including but not limited to optical or analogue communications channel(s) 908. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

What is claimed is:

1. An apparatus for interference based wave synthesis, the apparatus comprising:
   a first input wave generator;
   a second input wave generator; and
   a signal processor configured to:
      receive information defining output wave characteristics of an output wave that is to be generated by interfering waves generated respectively by the first input wave generator and the second input wave generator, said output wave characteristics comprising at least an output wave frequency B, and an output signal amplitude M;
      determine a constant value A;
      drive the first input wave generator to generate a first input wave, wherein said first input wave has:
         a frequency (A+B), wherein A is the determined constant value and B is the output wave frequency of the output wave; and
         an amplitude having a first amplitude value that is generated by implementing a function that receives the constant value A as an input; and
      drive the second input wave generator to generate a second input wave, wherein said first input wave has:
         a frequency (A−B), wherein A is the determined constant value and B is the output wave frequency of the output wave; and
         an amplitude having a second amplitude value that is generated based on implementing a function that receives the constant value A as an input.

2. The apparatus as claimed in claim 1, wherein the first input wave generator is configured to define a first wave output path, and the second input wave generator is configured to define a second wave output path, such that the first input wave and the second input wave interfere with each other within an interference region defined by an intersection of the first wave output path and the second wave output path.

3. A method for interference based wave synthesis, the method comprising:
   receiving information defining output wave characteristics, said output wave characteristics comprising at least an output wave frequency B, and an output signal amplitude M;
   determining a constant value A;
   generating a first input wave, wherein said first input wave has:
      a frequency (A+B), wherein A is the determined constant value and B is the output wave frequency of the output wave; and
      an amplitude having a first amplitude value that is generated by implementing a function that receives the constant value A as an input; and
   generating a second input wave, wherein said second input wave has:
      a frequency (A−B, wherein A is the determined constant value and B is the output wave frequency of the output wave; and
      an amplitude having a second amplitude value that is generated based on implementing a function that receives the constant value A as an input.

4. The method as claimed in claim 3, wherein the first input wave and the second input wave interfere with each other within an interference region.

5. A computer program product for implementing interference based wave synthesis, comprising a non-transitory computer usable medium having computer readable program code embodied therein, the computer readable program code comprising instructions for:
   receiving information defining output wave characteristics, said output wave characteristics comprising at least an output wave frequency B, and an output signal amplitude M;
   determining a constant value A;
   generating a first input wave, wherein said first input wave has:
      a frequency (A+B), wherein A is the determined constant value and B is the output wave frequency of the output wave; and
      an amplitude having a first amplitude value that is generated by implementing a function that receives the constant value A as an input; and
   generating a second input wave, wherein said second first input wave has:
      a frequency (A−B), wherein A is the determined constant value and B is the output wave frequency of the output wave; and
      an amplitude having a second amplitude value that is generated based on implementing a function that receives the constant value A as an input.

6. The apparatus as claimed in claim 1, wherein the signal processor is configured to:
   drive the first input wave generator and the second input wave generator such that the first amplitude value of the first input wave is equal to the second amplitude value of the second input wave.

7. The apparatus as claimed in claim 1 wherein the output wave frequency B has a value that is expressible by the waveform expression:

$$\cos(B*t)=\sin((A+B)*t)/(2*\sin(A*t))+\sin*(A-B)*t)/(2*\sin(A*t));\text{ or}$$

$$\sin A \cos B = (\sin(A+B)+\sin(A-B))/2;\text{ or}$$

$$\cos B = (\sin(A+B)+\sin(A-B))/(2 \sin A);\text{ or}$$

$$\cos A \sin B = (\sin(A+B)-\sin(A-B))/2;\text{ or}$$

$$\sin B = (\sin(A+B)-\sin(A-B))/(2 \cos A);\text{ or}$$

$$\cos A \cos B = (\cos(A+B)+\cos(A-B))/2;\text{ or}$$

$$\cos B = (\cos(A+B)+\cos(A-B))/(2 \cos A);\text{ or}$$

$$\cos A = (\cos(A+B)+\cos(A-B))/(2 \cos B);\text{ or}$$

$$\sin A \sin B = (\cos(A-B)-\cos(A+B))/2;\text{ or}$$

$$\sin B = (\cos(A-B)-\cos(A+B))/(2 \sin A);\text{ or}$$

$$\sin A = (\cos(A-B)-\cos(A+B))/(2 \sin B).$$

8. The apparatus as claimed in claim 1 wherein the constant value A is selected such that:
   the frequency (A+B) of the first input wave generator is higher than the output wave frequency B; and
   the frequency (A−B) of the second input wave generator is higher than the output wave frequency B.

9. The apparatus as claimed in claim 1, wherein one or both of the first input wave and the second input wave are any of:
  natural, periodic, repeating, non-repeating, or aperiodic waves; or
  created from one or more interfering waves, including by any of constructive interference, or phased array(s);
  generated by one or more mathematical functions, or one or more lookup tables.

10. The apparatus as claimed in claim 2, wherein during interference the first input wave and the second input wave are incident on each other, facing the same direction, parallel, anti-parallel, or at an angle with respect to each other.

11. The apparatus as claimed in claim 2, further comprising one or more waveguides to optimize interference of the first input wave and the second input wave within the interference region.

12. The apparatus as claimed in claim 2, wherein the first input wave and the second input wave are interfered in vacuum, or within a medium, or within multiple media.

13. The apparatus as claimed in claim 2, configured for sound proofing or ultrasonic damping to prevent ultrasonic frequencies from exiting the interference region.

14. The apparatus as claimed in claim 1, configured for any of spread spectrum communication, private demodulation or secure demodulation, or power transfer.

15. The apparatus as claimed in claim 1, wherein the output wave has a frequency that is different from frequencies of the first input wave and the second input wave respectively.

16. The method as claimed in claim 3, wherein the first amplitude value of the first input wave is equal to the second amplitude value of the second input wave.

17. The method as claimed in claim 3, wherein the output wave frequency B has a value that is expressible by the waveform expression:

$$\cos(B*t)=\sin((A+B)*t)/(2*\sin(A*t))+\sin*(A-B)*t/(2*\sin(A*t)); \text{ or}$$

$$\sin A \cos B=(\sin(A+B)+\sin(A-B))/2; \text{ or}$$

$$\cos B=(\sin(A+B)+\sin(A-B))/(2 \sin A); \text{ or}$$

$$\cos A \sin B=(\sin(A+B)-\sin(A-B))/2; \text{ or}$$

$$\sin B=(\sin(A+B)-\sin(A-B))/(2 \cos A); \text{ or}$$

$$\cos A \cos B=(\cos(A+B)+\cos(A-B))/2; \text{ or}$$

$$\cos B=(\cos(A+B)+\cos(A-B))/(2 \cos A); \text{ or}$$

$$\cos A=(\cos(A+B)+\cos(A-B))/(2 \cos B); \text{ or}$$

$$\sin A \sin B=(\cos(A-B)-\cos(A+B))/2; \text{ or}$$

$$\sin B=(\cos(A-B)-\cos(A+B))/(2 \sin A); \text{ or}$$

$$\sin A=(\cos(A-B)-\cos(A+B))/(2 \sin B).$$

18. The method as claimed in claim 3, wherein the constant value A is selected such that:
  the frequency (A+B) of the first input wave generator is higher than the output wave frequency B; and
  the frequency (A−B) of the second input wave generator is higher than the output wave frequency B.

19. The method as claimed in claim 3, wherein one or both of the first input wave and the second input wave are any of:
  natural, periodic, repeating, non-repeating, or aperiodic waves; or
  created from one or more interfering waves, including by any of constructive interference, or phased array(s);
  generated by one or more mathematical functions, or one or more lookup tables.

20. The method as claimed in claim 4, wherein during interference the first input wave and the second input wave are incident on each other, facing the same direction, parallel, anti-parallel, or at an angle with respect to each other.

21. The method as claimed in claim 4, further comprising optimizing interference of the first input wave and the second input wave within the interference region with one or more waveguides.

22. The method as claimed in claim 4, wherein the first input wave and the second input wave are interfered in vacuum, or within a medium, or within multiple media.

23. The method as claimed in claim 4, further comprising sound proofing or ultrasonic damping to prevent ultrasonic frequencies from exiting the interference region.

24. The method as claimed in claim 3, wherein the method is performed for any of spread spectrum communication, private demodulation or secure demodulation, or power transfer.

25. The method as claimed in claim 3, wherein the output wave has a frequency that is different from frequencies of the first input wave and the second input wave respectively.

* * * * *